US011485377B2

(12) United States Patent
Lu et al.

(10) Patent No.: US 11,485,377 B2
(45) Date of Patent: Nov. 1, 2022

(54) VEHICULAR COOPERATIVE PERCEPTION FOR IDENTIFYING A CONNECTED VEHICLE TO AID A PEDESTRIAN

(71) Applicant: Toyota Motor Engineering & Manufacturing North America, Inc., Plano, TX (US)

(72) Inventors: Hongsheng Lu, Mountain View, CA (US); Rui Guo, Mountain View, CA (US)

(*) Notice: Subject to any disclaimer, the term of this patent is extended or adjusted under 35 U.S.C. 154(b) by 258 days.

(21) Appl. No.: 16/784,084

(22) Filed: Feb. 6, 2020

(65) Prior Publication Data

US 2021/0245773 A1 Aug. 12, 2021

(51) Int. Cl.
*B60W 50/04* (2006.01)
*B60R 16/023* (2006.01)
(Continued)

(52) U.S. Cl.
CPC ....... *B60W 50/045* (2013.01); *B60R 16/0231* (2013.01); *B60W 10/18* (2013.01);
(Continued)

(58) Field of Classification Search
CPC .... B60W 50/045; B60W 10/18; B60W 10/20; B60W 50/08; B60W 2556/65;
(Continued)

(56) References Cited

U.S. PATENT DOCUMENTS 8,340,894 B2 12/2012 Yester
8,849,688 B2 9/2014 Cash, Jr. et al.
(Continued)

FOREIGN PATENT DOCUMENTS

WO 2018128946 7/2018

OTHER PUBLICATIONS

Gerla, "Vehicular cloud computing," 2012 The 11th annual mediterranean ad hoc networking workshop (Med-Hoc-Net) IEEE, 2012, pp. 152-155.
(Continued)

*Primary Examiner* — Tyler D Paige
(74) *Attorney, Agent, or Firm* — Burbage Law, P.C.; Jon-Michael Burbage

(57) ABSTRACT

The disclosure includes embodiments for vehicular cooperative perception for identifying a subset of connected vehicles from a plurality to aid a pedestrian. In some embodiments, a method includes analyzing pedestrian data to determine a scenario depicted by the pedestrian data and a subset of the connected vehicles from the plurality that have a clearest line of the pedestrian. The method includes identifying a group of conflicted vehicles from the subset whose driving paths conflict with a walking path of the pedestrian. The method includes determining, based on the scenario, digital twin data describing a digital twin simulation that corresponds to the scenario. The method includes determining, based on the digital twin data and the pedestrian data, a group of modified driving paths for the group of conflicted vehicles. The method includes causing the group of conflicted vehicles to travel in accordance with the group of modified driving paths.

20 Claims, 3 Drawing Sheets

(51) Int. Cl.
*B60W 10/18* (2012.01)
*B60W 10/20* (2006.01)
*G07C 5/00* (2006.01)
*H04W 4/40* (2018.01)
*B60W 50/08* (2020.01)
*B60W 50/00* (2006.01)

(52) U.S. Cl.
CPC ............ *B60W 10/20* (2013.01); *B60W 50/08* (2013.01); *G07C 5/008* (2013.01); *H04W 4/40* (2018.02); *B60W 2050/0075* (2013.01); *B60W 2050/041* (2013.01); *B60W 2556/65* (2020.02)

(58) Field of Classification Search
CPC ... B60W 2050/0075; B60W 2050/041; H04W 4/40; B60R 16/0231; G07C 5/008
See application file for complete search history.

(56) References Cited

U.S. PATENT DOCUMENTS

| | | | |
|---|---|---|---|
| 9,064,420 | B2 | 6/2015 | Beckwith et al. |
| 9,805,592 | B2 | 10/2017 | Ibrahim et al. |
| 9,881,430 | B1 | 1/2018 | Shah et al. |
| 9,881,503 | B1 | 1/2018 | Goldman-Shenhar et al. |
| 10,182,952 | B1 | 1/2019 | Nelson-Herron et al. |
| 10,282,233 | B2 | 5/2019 | Liu et al. |
| 10,334,405 | B2 | 6/2019 | Altintas et al. |
| 10,930,143 | B2 * | 2/2021 | Linder ................. G08G 1/0141 |
| 2010/0039291 | A1 | 2/2010 | Harrison et al. |
| 2011/0282793 | A1 | 11/2011 | Mercuri et al. |
| 2014/0267263 | A1 | 9/2014 | Beckwith et al. |
| 2016/0179094 | A1 | 6/2016 | Sorokin et al. |
| 2018/0146323 | A1 | 5/2018 | Tseng et al. |
| 2018/0146471 | A1 * | 5/2018 | Xu ........................... H04L 67/12 |
| 2018/0241810 | A1 | 8/2018 | Lerzer et al. |
| 2018/0257683 | A1 | 9/2018 | Govindappa et al. |
| 2019/0132706 | A1 | 5/2019 | Altintas et al. |
| 2019/0132819 | A1 | 5/2019 | Tseng et al. |
| 2019/0191265 | A1 | 6/2019 | Altintas et al. |
| 2019/0205115 | A1 * | 7/2019 | Gomes .................... H04W 4/50 |
| 2019/0266295 | A1 | 8/2019 | Masuda et al. |
| 2019/0287079 | A1 | 9/2019 | Shiraishi et al. |
| 2020/0272155 | A1 * | 8/2020 | Lo ......................... G05D 1/0212 |

OTHER PUBLICATIONS

Lee, et al., "Vehicular cloud networking: architecture and design principles," IEEE Communications Magazine, vol. 52, No. 2, 2014, pp. 148-155.

Hagenauer, et al., "Vehicular micro clouds as virtual edge servers for efficient data collection," in Proc. ACM CarSys, 2017, pp. 31-35.

Higuchi, et al., "On the Feasibility of Vehicular Micro Clouds," in Proc. IEEE VNC, 2017, pp. 179-182.

Hagenauer, et al., "Parked cars as virtual network infrastructure: Enabling stable V2I access for long-lasting data flows," in Proc. ACM CarSys, 2017, pp. 57-64.

* cited by examiner

VEHICULAR COOPERATIVE PERCEPTION FOR IDENTIFYING A CONNECTED VEHICLE TO AID A PEDESTRIAN

BACKGROUND

The specification relates to vehicular cooperative perception for identifying a connected vehicle to aid a pedestrian. In particular, this specification relates to a collaborative computing process executed by a group of connected vehicles that provides vehicular cooperative perception for identifying a connected vehicle from among the group to aid a pedestrian.

Connected vehicles form clusters of interconnected vehicles (e.g., via vehicle-to-everything, i.e., "V2X") that are located at a similar geographic location. Such clusters are known as "vehicular micro clouds."

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In some embodiments, the operations are sub-dividable into different portions.

One general aspect includes a method for collaborative computing by a set of onboard vehicles computers installed in a plurality of connected vehicles, the method including: analyzing, by the set of onboard vehicle computers, sensor data and pedestrian data to determine (1) a scenario depicted by the pedestrian data and (2) a subset of the connected vehicles from among the plurality of connected vehicles that have a clearest line of a pedestrian, where the pedestrian data is generated by a pedestrian device which captures images as viewed by the pedestrian and the sensor data is generated by the plurality of connected vehicles; identifying a group of conflicted vehicles from the plurality of connected vehicles whose driving paths conflict with a walking path of the pedestrian; determining, based on the scenario, digital twin data describing a digital twin simulation that corresponds to the scenario; determining, based on the digital twin data and the pedestrian data, a group of modified driving paths for the group of conflicted vehicles; and causing the group of conflicted vehicles to travel in accordance with the group of modified driving paths. Other embodiments of this aspect include corresponding computer systems, apparatus, and computer programs recorded on one or more computer storage devices, each configured to perform the actions of the methods.

Implementations may include one or more of the following features. The method where the digital twin simulation is configured to identify optimized driving paths for conflicted vehicles that improve safety. The method where the group of modified driving paths are operable to optimize safety. The method where different tasks of the method are executed by different onboard vehicle computers of the plurality of vehicles. The method where the different tasks are assigned by an ego vehicle. The method where the ego vehicle is a connected vehicle from the plurality having a greatest computational ability relative to other connected vehicles of the plurality. The method where the plurality of connected vehicles is a vehicular micro cloud. The method where the plurality of connected vehicles is not a vehicular micro cloud. Implementations of the described techniques may include hardware, a method or process, or computer software on a computer-accessible medium.

One general aspect includes a computer program product included in a set of onboard vehicle computers included in a group of connected vehicles, the computer program product including computer code that is operable, when executed by the set of onboard vehicle computers, to cause the set of onboard vehicle computers to provide collaborative computing by executing steps including: analyzing, by the set of onboard vehicle computers, pedestrian data to determine a scenario depicted by the pedestrian data and a subset of the connected vehicles from the plurality that are in a line of sight of a pedestrian, where the pedestrian data is generated by a pedestrian device which captures images as viewed by the pedestrian; identifying a group of conflicted vehicles from the subset whose driving paths conflict with a walking path of the pedestrian; determining, based on the scenario, digital twin data describing a digital twin simulation that corresponds to the scenario; determining, based on the digital twin data and the pedestrian data, a group of modified driving paths for the group of conflicted vehicles; and causing the group of conflicted vehicles to travel in accordance with the group of modified driving paths. Other embodiments of this aspect include corresponding computer systems, apparatus, and computer programs recorded on one or more computer storage devices, each configured to perform the actions of the methods.

Implementations may include one or more of the following features. The computer program product where the digital twin simulation is configured to identify optimized driving paths for conflicted vehicles that improve safety. The computer program product where the group of modified driving paths are operable to optimize safety. The computer program product where different tasks of the steps are executed by different onboard vehicle computers of the plurality of vehicles. The computer program product where the different tasks are assigned by an ego vehicle that is a hub vehicle. Implementations of the described techniques may include hardware, a method or process, or computer software on a computer-accessible medium.

One general aspect includes a system including: a group of connected vehicles each including a communication unit that is communicatively coupled to an onboard vehicle computer so that the group includes a set of onboard vehicle computers, where the set of onboard vehicle computers are executing computer-executable code that is operable, when executed by the set of onboard vehicle computers, to cause the set of onboard vehicle computers to provide collaborative computing by executing operations including: analyzing, by the set of onboard vehicle computers, pedestrian data to determine a scenario depicted by the pedestrian data and a subset of the connected vehicles from the plurality that are in a line of sight of a pedestrian, where the pedestrian data is generated by a pedestrian device which captures images as viewed by the pedestrian; identifying a group of conflicted vehicles from the subset whose driving paths conflict with a walking path of the pedestrian; determining, based on the scenario, digital twin data describing a digital twin simulation that corresponds to the scenario; determining, based on the digital twin data and the pedestrian data, a group of modified driving paths for the group of conflicted vehicles; and causing the group of conflicted vehicles to travel in accordance with the group of modified driving paths. Other embodiments of this aspect include corresponding computer systems, apparatus, and computer programs recorded on one or more computer storage devices, each configured to perform the actions of the methods.

Implementations may include one or more of the following features. The system where the digital twin simulation is configured to identify optimized driving paths for conflicted vehicles that improve safety. The system where the group of modified driving paths are operable to optimize safety. The system where different portions of the operations are executed by different onboard vehicle computers of the group of vehicles. The system where the different portions of the operations are assigned by an ego vehicle. The system where the ego vehicle is a connected vehicle from the plurality having a greatest computational ability relative to other connected vehicles of the plurality. The system where the group of connected vehicles is a vehicular micro cloud. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
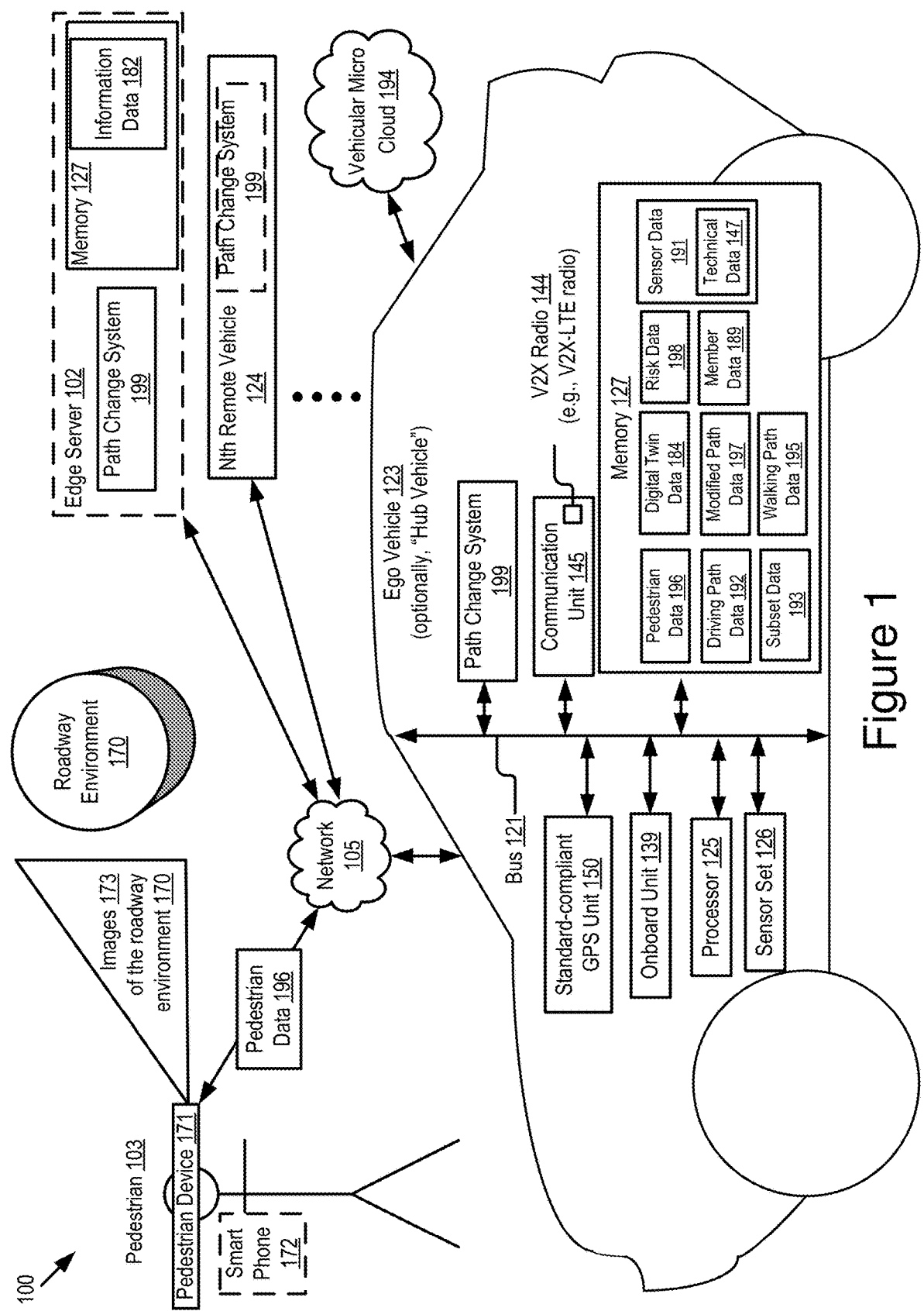
FIG. 1 is a block diagram illustrating an operating environment for a path change system according to some embodiments.

Described herein are embodiments that relate to a collaborative computing process which is executed by a group of vehicles and configured to use image data generated by a pedestrian device, which is worn by a pedestrian, as an input to the collaborative computing process. The collaborative computing process uses the image data to: (1) estimate the walking path of the pedestrian based on images captured by the pedestrian device and/or images captured by a subset of vehicles included in a group of vehicles and (2) modify the driving paths of one or more vehicles included in the group of vehicles so that collisions with the pedestrians do not occur. In some embodiments, one or more of the vehicles modify their driving path so that they do not collide with the pedestrian.

The embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over vehicle-to-vehicle (V2V) networks or V2X networks to perform computation, data storage, and data communication tasks in an efficient way. These types of tasks are referred to herein as "computational tasks."

Vehicular micro clouds are beneficial, for example, because they help vehicles to perform computationally expensive tasks that they could not perform alone or store large data sets that they could not store alone. The members that form a vehicular micro cloud may execute computing processes (e.g., such as those depicted in FIG. 3 or the first or second example general methods described below) together in parallel by a cooperative process. A "cooperative process" is sometimes referred to herein as a "collaborative computing process," a "method for collaborative computing," or some other reference to "collaborative computing." Individual steps of the computing processes may be executed by one or more vehicles in a collaborative fashion. The cooperative process may include the members exchanging V2X communications with one another that communicate outputs of their computations or digital data that may be beneficial to other members.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

Vehicular micro clouds are not an essential part of the embodiments described herein. Some embodiments do not include a vehicular micro cloud.

Vehicular micro clouds are accessible by various types of devices. For example, vehicular micro clouds are accessible by pedestrian devices. A pedestrian device is a processor-based electronic device that is operable to capture images, relay wireless messages including pedestrian data, and provide audio feedback to a user. In some embodiments, a pedestrian device is an electronic device that includes a camera that is operable to capture images of a roadway environment, a non-transitory memory that is operable to store digital data and computer code, a processor that is operable to execute the computer code, and a communication unit (e.g., a V2X radio) that is operable to send and receive wireless messages that include payloads such as digital data that describes the camera images or information describing a walking path for a pedestrian. In some embodiments, a pedestrian device is a processor-based computing device that is wearable on a head of a pedestrian such as smart glasses or augmented reality goggles (AR goggles).

In some embodiments, the pedestrian device also includes a client stored in the non-transitory memory of the pedestrian device which is accessible by the processor of the pedestrian device. The client includes code and routines that are operable, when executed by the processor, to cause the processor to control the operation of the camera of the pedestrian device to capture images of a roadway environment, build V2X wireless messages including pedestrian data that describes the images, and broadcast the V2X wireless messages to nearby connected vehicles that are within V2X transmission range of the pedestrian device. The client is also operable to receive V2X wireless messages from the path change system describing a risk to the pedestrian and instructions for a new walking path for the pedestrian. The pedestrian device includes an electronic display, a speaker, or some other peripheral that is accessible and controllable by the client so that the client can cause the pedestrian to be informed about the risk and the new walking path.

In some embodiments, the pedestrian device captures images of a roadway environment as the pedestrian is attempting to cross a roadway (or slightly before this time).

In some embodiments, the pedestrian device includes a V2X radio. The V2X radio operates in compliance with a V2X protocol. In some embodiments, the V2X radio broadcasts Basic Safety Messages ("BSM" or "safety message" if singular, "BSMs" or "safety messages" if plural). In some embodiments, the safety messages broadcast by the pedestrian device includes the pedestrian data as its payload. In some embodiments, the pedestrian data is included in part 2 of the safety message as specified by the DSRC protocol.

In some embodiments, the pedestrian data is digital data that describes, among other things, images of a roadway environment as captured by the camera of the pedestrian device.

In some embodiments a pedestrian device is not a smartphone.

As used herein, the term "vehicle" refers to a connected vehicle. For example, the ego vehicle and remote vehicle depicted in FIG. 1 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

One problem is that people have a difficult time crossing roadways on foot. This is particularly true of elderly people, children, blind persons, and all people in certain weather/environmental conditions (e.g., nighttime in rural environments, a "white out" snowstorm, very heavy rainfall, times of very bright sunshine, etc.). Vehicles may work collaboratively to help people cross the roadway on foot. However, there are many different vehicles, and some have a better vantage point than other vehicles, and correspondingly better sensor measurements than other vehicles. Solving this problem is important for the purpose of providing increased safety for pedestrians. The embodiments of the path change system described herein solve this problem.

Described herein are embodiments of a path change system. In some embodiments, the path change system improves the performance of a vehicular micro could because it beneficially enables the vehicular micro cloud to take steps to increase the safety of pedestrians in a roadway environment. In some embodiments, the path change system uses pedestrian data generated by a pedestrian device, which are worn by a pedestrian, as an input to a collaborative computing process which is executed by a group of vehicles and configured to execute steps including: (1) estimating the walking path of the pedestrian based on images captured by the pedestrian device and/or images captured by a subset of vehicles included in a group of vehicles; (2) determining that the pedestrian is at risk of a collision with one or more vehicles based on their estimated walking path of the pedestrian and the known or estimated driving paths of one or more vehicles; and (3) modifying the driving paths of one or more vehicles included in the group of vehicles so that collisions with the pedestrians do not occur. In some embodiments, one or more of the vehicles modify their driving path so that they do not collide with the pedestrian. The collision risk may be a risk of a collision with a vehicle, including those that are not included in the group of vehicles, or some other roadway object.

In some embodiments, the pedestrian device is selected from a group that includes one or more of the following: AR goggles; smart glasses; or any other pedestrian device that is not a smartphone and capable of generating the pedestrian data described herein. An example of the pedestrian data includes the pedestrian data 196 depicted in FIG. 1.

Some solutions to the problem described above might include a vehicle that has an outward facing electronic display mounted on the outside of the vehicle that displays a visual warning for pedestrians in case of collision; other solutions include a speaker of a vehicle that provides audible warnings for pedestrians. The path change system described herein specifically does not include an electronic display mounted on the outside of a vehicle and/or a speaker of a vehicle that provides warnings for a pedestrian.

Accordingly, the path change system improves the performance of a vehicle by enabling it to participate in a collaborative computing process with other vehicles that increases the safety of pedestrians that are in a roadway environment that includes the vehicles and the pedestrian.

The path change system includes code and routines that are operable, when executed by the onboard vehicle computers of a group of connected vehicles, to provide the following example functionality and benefits: (1) executing a collaborative computing process that is optimized to increase the safety of the pedestrian; (2) using digital twin simulations to predict the future walking path of the pedestrian; (3) using digital twin simulations to select a modified driving path for one or more vehicles that is optimized (e.g., by the digital twin simulations) to increase the pedestrian's safety; (4) a feedback loop which increase the accuracy of future digital twin simulations over time based on the real-world outcomes of (a) predictions about the future walking paths of the pedestrian which are made based on historical digital twin simulations, and/or (b) a modified driving path for one or more vehicles selected by the path change system based on the historical digital twin simulations; (5) a hub of a vehicular micro cloud, or some other group of connected vehicles which execute a collaborative computing process, which uses technology data and data about the future driving paths of vehicles to determine which vehicles should perform which steps (or portions of steps) from a method which is configured to determine a new driving path for one or more vehicles; (6) a hub of a vehicular micro cloud, or some other group of connected vehicles which execute a collaborative computing process, that uses technical data and information about the future driving paths of vehicles included in the vehicular micro cloud to assign tasks to the members of the vehicular micro cloud so that (a) more complex tasks are completed by more technically sophisticated vehicles and/or (b) tasks are assigned in consideration of how long each task will take to complete relative to how long each vehicle is estimated to remain a member of the vehicular micro cloud based on their future driving path relative to the future driving paths of the other members of the vehicular micro cloud; (7) a group of connected vehicles using collaborative computing techniques to analyze digital data to identify a presence of a pedestrian based on data from a pedestrian device worn by the pedestrian (i.e., pedestrian data) and/or data recorded by their own onboard sensors (i.e., vehicle-generated sensor data); and (8) a vehicle having a data structure that includes sensor data from a plurality of vehicles, pedestrian data from a pedestrian device, and digital twin data from a server/ roadside unit. The functionality and benefits described in this paragraph are illustrative and not an exhaustive list of the functionality and benefits provided by the embodiments of the path change system described herein.

Examples of the path change system are now described according to some embodiments. In some embodiments, the path change system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a pedestrian. For the purpose of clarity, the N remote vehicles may be referred to herein as the "remote vehicle" or the "remote vehicles" and this will be understood to describe N remote vehicles.

The ego vehicle and the remote vehicles may be human-driven vehicles, autonomous vehicles, or a combination of human-driven vehicles and autonomous vehicles. In some embodiments, the ego vehicle and the remote vehicles may be equipped with Dedicated Short-Range Communication (DSRC) equipment such as a GPS unit that has lane-level accuracy and a DSRC radio that is capable of transmitting DSRC messages.

In some embodiments, the ego vehicle and some or all of the remote vehicles include their own instance of a path change system. For example, in addition to the ego vehicle, some or all of the remote vehicles include an onboard unit having an instance of the path change system installed therein.

Accordingly, multiple instances of the path change system are installed in a group of connected vehicles. The group of connected vehicles may be arranged as a vehicular micro cloud or some other vehicular cloud. In some embodiments, the ego vehicle and the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud, meaning that they are members of various vehicular micro clouds that are all members of the same vehicular macro cloud so that they are still interrelated to one another and operable to execute a collaborative computing process.

Example General Methods

Two example general methods are now described. For the purpose of understanding these example general methods, assume that an operating environment includes a pedestrian and a group of connected vehicles that includes an ego vehicle and a remote vehicle. The pedestrian is wearing a pedestrian device. The pedestrian devices include a client. In some embodiments, he client includes code and routines that, when executed by a processor of the pedestrian device, causes the pedestrian device to capture images and transmit a wireless message to the group of vehicles. The wireless message includes pedestrian data as its payload. The pedestrian data is digital data that describes the images captured by the pedestrian device. Some of these images may include images of the ego vehicle and/or the remote vehicle.

In some embodiments, the pedestrian data describes the environment (e.g., weather, lighting conditions, visibility, etc.) in which the pedestrian is present and also whether the pedestrian is visually impaired. In some embodiments, the pedestrian data is generated by a phone or a combination of the smartphone and the pedestrian device. An example of the pedestrian data includes the pedestrian data 196 depicted in FIG. 1.

In some embodiments, in both the first example general method and the second example general method, the path change systems of the ego vehicle and the remote vehicle receive the pedestrian data from the network (e.g., a V2X network). The pedestrian data was previously broadcast by the client of the pedestrian device.

A first example general method is now described. As described above, in some embodiments the path change system is installed in the onboard units of the group of connected vehicles. The path change system includes computer code that is operable, when executed by the set of onboard vehicle computers, to cause the set of onboard vehicle computers to provide collaborative computing by executing some or all of the steps of the first example general method described below. In some embodiments, the path change system of a hub vehicle included in the group of connected vehicles determines, from among the group of vehicles, which of the vehicles will execute the following steps, or portions of the following steps of the first example general method, and then informs the other vehicles about the results of this determination:

Step 1: Use images captured by the pedestrian device to determine which vehicles are in the line of sight of the pedestrian.

Step 2: Use images captured by the cameras of the group of vehicles to determine a subset of vehicles from the group that has a clearest line of sight to the pedestrian—these vehicles now form a "subset of vehicles."

Step 3: Analyze the images captured by the pedestrian device to confirm that the subset of vehicles are those which are in the line of sight of the pedestrian, which thereby confirms that the outcome of step 2 is accurate.

Step 4: Engage in V2X communication with the subset of vehicles to determine their future driving path plan. For example, the other vehicles provide digital data via V2X communication that describes there future driving path. Such digital data is a standard component of a BSM which connected vehicles routinely broadcast at a regular interval, e.g., once every 0.1 seconds, in accordance with standards that govern V2X communication among connected vehicles.

Step 5: Estimate the walking path of the pedestrian based on the images captured by the pedestrian device and/or the images captured by the subset of vehicles.

Step 6: Determine, based on the estimated walking path of the pedestrian and the future driving path plan of the subset of vehicles that the pedestrian is at risk from the future driving path plan of the subset of vehicles. For example, this determination indicates that the future driving path plan exceeds a safety threshold that indicates that the pedestrian may be hit or scared by one of the vehicles included in the subset of vehicles. The safety threshold may include a threshold of distance or some other threshold related to safety for the pedestrian. The output of this step is risk data. The risk data describes the risk to the pedestrian. In some embodiments, the risk data also describes the degree of risk based on the likelihood that a collision or near miss will occur. An example of the risk data includes the risk data 198 depicted in FIG. 1.

Step 7: Analyze the future driving path plan of the subset of vehicles and the estimated walking path of the pedestrian to determine how to best modify the further driving path plan of the subset of vehicles and thereby increase the safety of the pedestrian—the output of this step is a set of modified driving paths, one path for each vehicle included in the subset.

Step 8: Engage in V2X communication to communicate with the subset of vehicles to inform them about their modified driving path as well as the modified driving paths of the other vehicles included in the subset.

Step 9: Cause the subset of vehicles to operate in accordance with the modified driving paths.

In some embodiments, the steps described above are executable in any order. Some of steps may be omitted.

In some embodiments, some or all of the steps described above are collaboratively executed by the onboard vehicle computers of two or more vehicles. In some embodiments, some or all of the steps described above are collaboratively executed by the onboard vehicle computers of a vehicular micro cloud.

A second example general method is now described. In some embodiments, the path change system is installed in the onboard units of the group of connected vehicles. The path change system includes computer code that is operable, when executed by the set of onboard vehicle computers, to cause the set of onboard vehicle computers to provide collaborative computing by executing some or all of the steps of the second example general method described below:

Step 1: The client of the pedestrian device causes the onboard cameras of the pedestrian device to capture one or more images of the roadway environment that includes the pedestrian device. In some embodiments, the pedestrian data is digital data that describes these images. An example of the pedestrian data includes the pedestrian data 196 depicted in FIG. 1.

Step 2: The client of the pedestrian device controls the operation of the communication unit of the pedestrian device to cause the communication unit to transmit (e.g., broadcast) the pedestrian data to one or more vehicles within a vicinity (e.g., V2X transmission range) via the network which is a V2X network.

Step 3: The path change system receives the pedestrian data.

Step 4: The path change system analyzes the images described by the pedestrian data to determine which vehicles are in the line of sight of the pedestrian.

Step 5: The path change system controls the operation of the sensors of the vehicle to cause the sensors to capture/record the sensor data. In some embodiments, the sensor data is digital data that describes images of the roadway environment from the perspective of the vehicle. An example of the sensor data includes the sensor data 191 depicted in FIG. 1.

In some embodiments, the remote vehicle includes a path change system that causes the onboard sensors of the remote vehicle to execute step 5; the ego vehicle also includes a path change system that executes step 5. The path change system of the remote vehicle causes the control unit of the remote vehicle to send a V2X message to the ego vehicle, as well as other vehicles included in a group of vehicles; this V2X message includes the sensor data of the remote vehicle as its payload so that the path change system of the ego vehicle has access to the sensor data of the remote vehicle. The path change system of the ego vehicle also distributes its sensor data to the group of vehicles in a similar fashion as described above for the remote vehicle Regarding the group of vehicles described in the preceding paragraph, the vehicle and N remote vehicles form a "group of vehicles." In some embodiments, the group of vehicles is a vehicular micro cloud or a set of vehicles working together to execute the steps described here as a collaborative computing process.

In some embodiments, the sensor data depicted in FIG. 1 includes images captured by the remote vehicle.

Step 6: The path change system uses images captured by the cameras of the group of vehicles to determine a subset of vehicles from the group that has a clearest line of sight to the pedestrian—these vehicles now form a "subset of vehicles" as this phrase is used herein. In some embodiments, the output of step 6 is the subset data. The subset data is digital data that describes the vehicles that are included in the subset identified at step 6. An example of the subset data includes the subset data 193 depicted in FIG. 1.

Step 7: The path change system analyzes the images described by the pedestrian data 196 to confirm that the subset of vehicles described by the subset data 193 are the vehicles which are in the line of sight of the pedestrian, which thereby confirms that the outcome of step 6 is accurate.

Step 8: The path change system controls the operation of the communication unit to exchange V2X communications with the subset of vehicles to determine their future driving path plan. The future driving path plan is the path that these vehicles will be driving in the near future (e.g., in the next seconds or minutes). The driving path data is digital data that describes the future driving path plan of these vehicles. An example of the driving path data includes the driving path data 192 depicted in FIG. 1. In some embodiments, the driving path data is included in a BSM that is broadcast by each of the vehicles included in the group of vehicles.

Step 9: The path change system estimates the walking path of the pedestrian based on the images captured by the pedestrian device and/or the images captured by the subset of vehicles. The walking path data includes digital data that describes the estimated walking path of the pedestrian. An example of the walking path data includes the walking path data 195 depicted in FIG. 1.

In some embodiments, this step may be determined based on a digital twin analysis conducted by the path change system using the pedestrian data and the sensor data as inputs to the digital twin analysis. In some embodiments, the digital twin analysis may include execution of new digital twin simulations based on these inputs or comparing the pedestrian data/sensor data to the output of previously performed digital twin simulations to determine which simulation is most similar to the scenario indicated by the pedestrian data/sensor data and then predicting the future walking path of the pedestrian based on this output.

In some embodiments, the digital twin data includes digital data that describes all the digital data necessary to generate a digital twin simulation that duplicates the real-world roadway environment. The digital twin data includes, for example, sensor data that describes the roadway environment (e.g., the roadway environment 170 depicted in FIG. 1) in exact detail and simulation data that describes a digital twin simulation that includes the ego vehicle, the remote vehicle, and the pedestrian interacting in a digital twin simulation that includes the digital twin of the real-world as described by the sensor data that is included in the digital twin data. An example of the digital twin data includes the digital twin data 184 depicted in FIG. 1.

In some embodiments, the path change system 199 includes a game engine and any simulation software which is necessary to generate the digital twin data 184, execute one or more digital twin simulations based on the digital twin data 184, the sensor data 191 and/or the pedestrian data 196, and analyze the outcome of these digital twin simulations to predict the future walking path of the pedestrian. An example of the digital twin data is depicted in FIG. 1 as digital twin data 184.

Examples of digital twin data, game engines, and simulation software are described in the following patent applications, the entirety of each of which are hereby incorporated by reference: U.S. patent application Ser. No. 16/691,346 entitled "DIGITAL TWIN SIMULATION-BASED VEHICULAR COMMUNICATION PLANNING" and filed on filed on Nov. 21, 2019; U.S. patent application Ser. No. 16/007,693 entitled "DIGITAL TWIN FOR VEHICLE RISK EVALUATION" and filed on Jun. 13, 2018; U.S. patent application Ser. No. 15/925,070 entitled "SENSOR-BASED DIGITAL TWIN SYSTEM FOR VEHICULAR ANALYSIS" and filed on Mar. 19, 2018; U.S. patent application Ser. No. 16/165,002 entitled "DIGITAL BEHAVIORAL TWIN SYSTEM FOR INTERSECTION MANAGEMENT IN CONNECTED ENVIRONMENTS" and filed on Oct. 19, 2018; U.S. patent application Ser. No. 16/007,796 entitled "COLLISION AVOIDANCE FOR A CONNECTED VEHICLE BASED ON A DIGITAL BEHAVIORAL TWIN" and filed on Jun. 13, 2018; and U.S. patent application Ser. No. 15/908,768 entitled "PROACTIVE VEHICLE MAINTENANCE SCHEDULING BASED ON DIGITAL TWIN SIMULATIONS" and filed on Feb. 28, 2018.

In some embodiments, output of the digital twin simulations is the walking path data. The walking path data includes digital data that describes the estimated future walking path of the pedestrian as indicated by one or more digital twin simulations executed by the path change system.

Step 10: The path change system determined, based on the estimated walking path of the pedestrian and the future driving path plan of the subset of vehicles that the pedestrian is at risk from the future driving path plan of the subset of vehicles. For example, this determination indicates that the future driving path plan exceeds a safety threshold that indicates that the pedestrian may be hit or scared by one of the vehicles included in the subset of vehicles. The safety threshold may include a threshold of distance or some other threshold related to safety for the pedestrian. The output of this step is risk data. The risk data describes the risk to the pedestrian. In some embodiments, the risk data also describes the degree of risk based on the likelihood that a collision or near miss will occur. An example of the risk data includes the risk data 198 depicted in FIG. 1.

In some embodiments, this method ends at step 10 unless the degree of risk to the pedestrian meets a threshold for severity. Step 10 may include comparing the risk data to the threshold for severity to determine whether the threshold is met.

Step 11: The path change system analyzes the future driving path plan of the subset of vehicles and the estimated walking path of the pedestrian to determine how to best modify the further driving path plan of the subset of vehicles and thereby increase the safety of the pedestrian—the output of this step is a set of modified driving paths, one path for each vehicle included in the subset. The output of this step is the modified path data. The modified path data is digital data that describes the set of modified driving paths. An example of the modified path data includes the modified path data 197 depicted in FIG. 1.

In some embodiments, step 11 is executed by the onboard vehicle computers of a plurality of vehicles at the same time, each of which if tasked with performing a portion of the overall computation for determining the optimized driving path.

In some embodiments, the vehicles included in the group of vehicles each store digital twin data. The digital twin data is digital data that describes, among other things, the results for a series of digital twin simulations that were configured to determine the optimum driving paths for a group of vehicles to travel in order to increase safety.

In some embodiments, the vehicles use the digital twin data when performing their computation as described above for step 11. For example, the path change systems of the vehicles include a plurality of instances of digital twin data, one for each digital twin simulation which was executed, and the path change systems determine which instance of digital twin data 184 is most similar to the current scenario being experienced by the vehicles and the pedestrian; the path change system then uses this digital twin data as part of their analysis at step 11 described above.

In some embodiments, the digital twin simulations described above are executed by a roadside unit (RSU) having an edge server as an element of the RSU. In some embodiments, the digital twin simulations are executed by a cloud server and the digital twin data is provided to the vehicles via the network.

In some embodiments, the digital twin simulations are executed by a server (e.g., a cloud server or an edge server) which provides the digital twin data to the vehicles. In some embodiments, the vehicles report back information data to the cloud server. The information data is digital data that describes the outcome of the modified driving path, i.e., whether safety was actually improved. This information data serves as a form of feedback which is then used to execute new updated digital twin simulations, which yields updated digital twin data which is outputted to the vehicles. In this way, the process continually improves over time based on use of the feedback loop by the cloud server and the cloud server continually providing refreshed digital twin data to the vehicles.

Step 12: The path change system controls the operation of the communication unit to cause the communication unit to transmit V2X communications to communicate with the subset of vehicles to inform them about their modified driving path as well as the modified driving paths of the other vehicles included in the subset. For example, the V2X communications include the modified path data 197 as their payload.

Step 13: The path change system causes the subset of vehicles to operate in accordance with the modified driving paths. The path change systems of the recipients of these V2X communications control the operation of the ADAS systems or autonomous driving systems of the vehicles which they are installed in to ensure that these vehicles change their driving paths in accordance with the new driving paths described by the modified path data 197.

In some embodiments, the vehicles included in the group of vehicles report back information data to the edge server and/or cloud server (e.g., the edge server 102 depicted in FIG. 1). The information data is digital data that describes outcome of steps 1-13 described above. The information data is included in V2X messages that the group of vehicles transmit to the edge server and/or the cloud server via the network. The V2X message includes the information data as its payload. The information data includes digital data that describes the outcome of the modified pedestrian walking path, i.e., whether safety was actually improved. This information data serves as a form of feedback which is then used by the edge server and/or the cloud server to execute new updated digital twin simulations, which yields updated digital twin data which is outputted to the vehicles via V2X messages that are transmitted by the edge server and/or the cloud server to the vehicles via the network. In this way, the collaborative computing process described above continually improves over time based on use of the feedback loop by the edge server/cloud server and the edge server/cloud server continually providing refreshed digital twin data to the vehicles.

In some embodiments, an instance of the pedestrian navigation system is also installed in a cloud server or an edge server that is communicatively coupled to the same wireless network as a vehicle (e.g., the ego vehicle) that also includes an instance of the pedestrian navigation system installed in its ECU.

In some embodiments, the edge server described above is a conventional edge server and the cloud server described above is a conventional cloud server.

In some embodiments, the ego vehicle and the remote vehicle are members of a vehicular micro cloud.

Hub Vehicle

Figure 3:
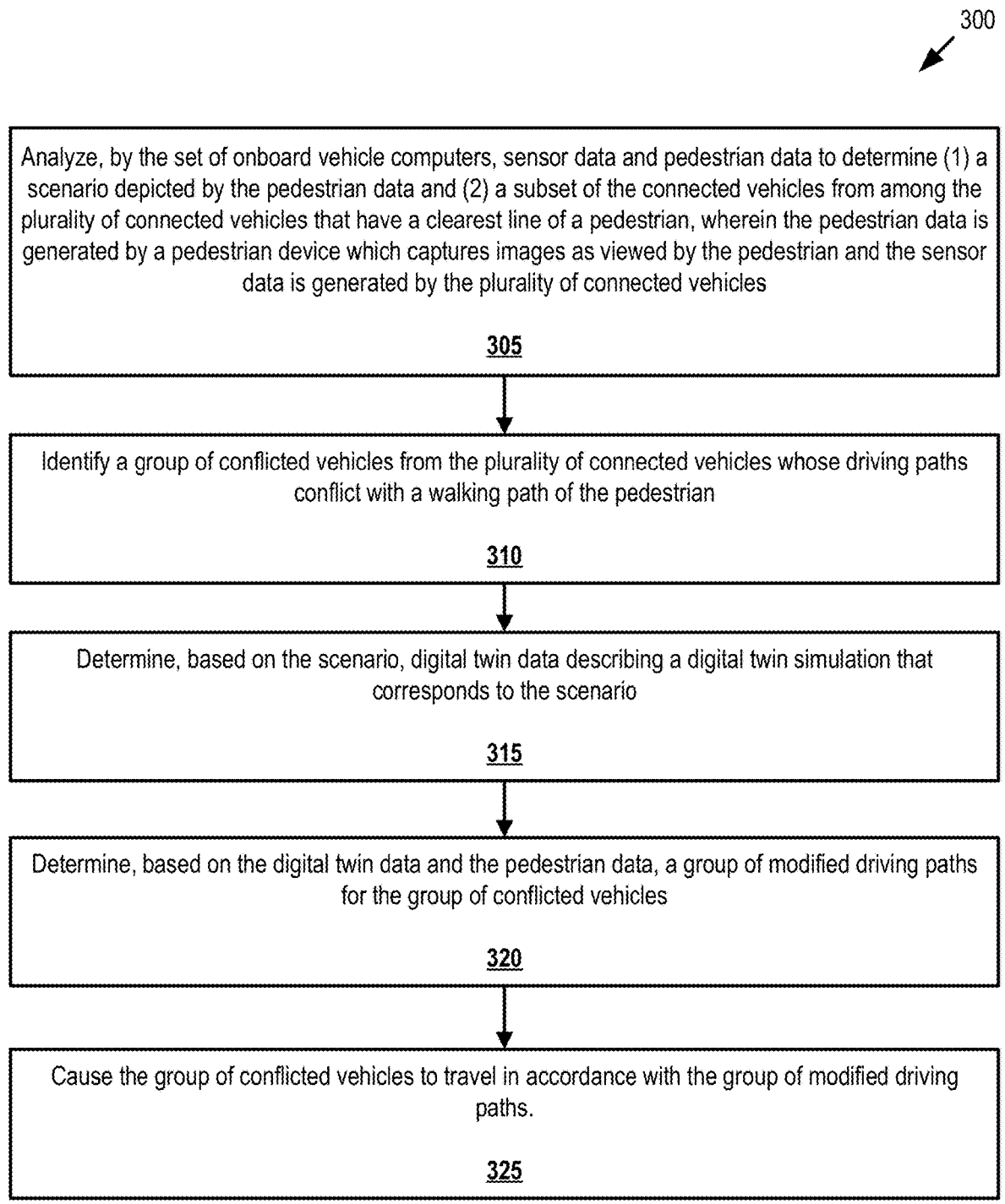
FIG. 3 is a flowchart of an example method for a collaborative computing process executed by a group of connected vehicles according to some embodiments.

In some embodiments, a method executed by the path change system (e.g., the first example general method described above, the second example general method described above, or some other method such as that depicted in FIG. 3) is an element of a hub vehicle. For example, the vehicular micro cloud formed by the path change system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub."

In some embodiments, the path change system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most memory most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. An example of the technical data includes the technical data 147 depicted in FIG. 1.

In some embodiments, the technical data 147 is an element of the sensor data 191. In some embodiments, the vehicles execute step 5 of the second example general method to distribute their sensor data 191 and this sensor data 191 includes the technical data 147 for each vehicle that executes the step 5; in this way, the hub vehicle receives the technical data 147 for each of the vehicles included in the vehicular micro cloud.

In some embodiments, the hub vehicle is whichever member vehicle of a vehicular micro cloud has a fastest onboard computer relative to the other member vehicles.

In some embodiments, the path change system is operable to provide its functionality to operating environments and network architectures that do not include a server. Use of servers is problematic because they create latency. For example, some prior art systems require that groups of vehicles relay all their messages to one another through a server. This is particularly problematic and prone to latency which renders the solution inoperable in real-world scenarios, especially for safety critical scenarios. By comparison, the use of server is an optional feature in for the path change system. Indeed, the preferred embodiment would not include a server since, for example: (1) inclusion of a server leads to undesirable latency; and (2) the computational power of the server is not needed by the vehicular micro clouds because the whole point of vehicular micro clouds is to harness the unused computational abilities of the fleet of vehicles that are on the roadway at any given time.

In some embodiments, the path change system is operable to provide its functionality even though the vehicle which includes the path change system does not have a Wi-Fi antenna as part of its communication unit. By comparison, some of the existing solutions require the use of a Wi-Fi antenna in order to provide their functionality. Because the path change system does not require a Wi-Fi antenna, it is able to provide its functionality to more vehicles, including older vehicles without Wi-Fi antennas.

In some embodiments, the path change system is operable to provide its functionality even though the vehicle which includes the path change system does not have a V2X radio as part of its communication unit. By comparison, some of the existing solutions require the use of a V2X radio in order to provide their functionality. Because the path change system does not require a V2X radio, it is able to provide its functionality to more vehicles, including older vehicles without V2X radios.

In some embodiments, the path change system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the path change system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the path change system manages the vehicular micro cloud so that it is accessible for membership by vehicles which do not have V2V communication capability. This is beneficial because it ensures that legacy vehicles have access to the benefits provided by the vehicular micro cloud. The existing approaches do not provide this functionality.

In some embodiments, the path change system is configured so that a particular vehicle (e.g., the ego vehicle) is pre-designated by a vehicle manufacturer to serve as a hub vehicle for any vehicular micro cloud that it joins. The existing approaches do not provide this functionality.

Vehicular Micro Clouds

The existing solutions generally do not include vehicular micro clouds. Some groups of vehicles (e.g., cliques) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one. Accordingly, any group of vehicles that includes a server or whose functionality incorporates a server is not a vehicular micro cloud as this term is used herein.

In some embodiments, a vehicular micro cloud is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of the methods described herein (e.g., the first example general method described above, the second example general method described above, or the method depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

A vehicular micro cloud is responsible to doing computational analysis itself using the onboard vehicle computers of its members. A group of vehicles which relies on a cloud server for its computational analysis, or the difficult parts of its computational analysis, is not a vehicular micro cloud. Although FIG. 1 depicts a server in an operating environment that includes the path change system, the server is an optional feature of the operating environment. An example of a preferred embodiment of the path change system does not include the server in the operating environment which includes the path change system.

In some embodiments, the path change system enables a group of vehicles to perform computationally expensive tasks that could not be completed by any one vehicle in isolation.

Example Operating Environment

The path change system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the path change system includes software installed in an onboard unit of a connected vehicle. This software is the "path change system" described herein.

An example operating environment for the embodiments described herein includes an ego vehicle and at least one remote vehicle. The ego vehicle and the remote vehicle are both connected vehicles having communication units that enable them to send and receive wireless messages via one or more vehicular networks. In some embodiments, both the ego vehicle and the remote vehicle include an onboard unit having a path change system stored therein. An example of a preferred embodiment of the path change system includes a serverless operating environment. A serverless operating environment is an operating environment which includes at least one path change system and does not include a server.

In some embodiments, the path change system includes code and routines that are operable, when executed by a processor of the onboard unit, to cause the processor to execute one or more of the steps of one or more of the following: the first example general method; the second example general method; and the method 300 depicted in FIG. 3.

This application is related to U.S. patent application Ser. No. 15/644,197 filed on Jul. 7, 2017 and entitled "Computation Service for Mobile Nodes in a Roadway Environment," the entirety of which is hereby incorporated by reference.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication-Application layer (review); and EN 13372:2004 Dedicated Short-Range Communication (DSRC)—DSRC profiles for RTTT applications (review); EN ISO 14906:2004 Electronic Fee Collection-Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the path change system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

Embodiments of the path change system are now described. Referring now to FIG. 1, depicted is a block diagram illustrating an operating environment 100 for a path change system 199 according to some embodiments. The operating environment 100 is present in a geographic region so that each of the elements of the operating environment 100 is present in the same geographic region.

The operating environment 100 may include one or more of the following elements: an ego vehicle 123 (referred to herein as a "vehicle 123" or an "ego vehicle 123"); a pedestrian device 171 worn by a pedestrian 103; an Nth remote vehicle 124 (where "N" refers to any positive whole number greater than one); and an edge server 102. These elements of the operating environment 100 are depicted by way of illustration. In practice, the operating environment 100 may include one or more of the elements depicted in FIG. 1. The Nth remote vehicle 124 may be referred to as a remote vehicle 124.

In some embodiments, the ego vehicle 123, the remote vehicle 124, and the network 105 are elements of a vehicular micro cloud 194. The edge server 102 is not an element of the vehicular micro cloud 194. The edge server 102 and the smartphone 172 are depicted in FIG. 1 with a dashed line to indicate that they are optional features of the operating environment 100.

In some embodiments, the operating environment 100 is a serverless operating environment.

In the depicted embodiment, the ego vehicle 123, the remote vehicle 124, the edge server 102, and the pedestrian device 171 include similar elements. For example, each of these elements of the operating environment 100 include their own processor 125, bus 121, memory 127, communication unit 145, processor 125, sensor set 126, and path change system 199 (with the exception that the pedestrian device 171 includes a client, which is not pictured, and not a path change system 199). These elements of the ego vehicle 123, the remote vehicle 124, the edge server 102, and the pedestrian device 171 provide the same or similar functionality relative to one another. Accordingly, these descriptions will not be repeated in this description.

In the depicted embodiment, the ego vehicle 123 and remote vehicle 124 may each store similar digital data.

The vehicular micro cloud 194 may be a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. In this patent application the vehicular micro cloud 194 may be a stationary vehicular micro cloud or a mobile vehicular micro cloud. Each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, the terms a "vehicular micro cloud" and a "micro-vehicular" cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member."

In some embodiments, the memory 127 of one or more of the endpoints stores member data 189. The member data 189 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 189 describes logical associations between endpoints which are a necessary component of the vehicular micro cloud 194 and serves the differentiate the vehicular micro cloud 194 from a mere V2X network. In some embodiments, a vehicular micro cloud 194 must include a hub vehicle and this is a further differentiation from a vehicular micro cloud 194 and a V2X network or a group or clique of vehicles which is not a vehicular micro cloud 194.

The vehicular micro cloud 194 does not include a hardware server. Accordingly, the vehicular micro cloud 194 may be described as serverless.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data 189. The network 105 also does not include a hub vehicle.

In some embodiments, one or more of the ego vehicle 123 and the remote vehicle 124 are DSRC-equipped vehicles. For example, the ego vehicle 123 includes a standard-compliant GPS unit 150 and a DSRC radio (e.g., the V2X radio 144 is a DSRC radio in embodiments where the ego vehicle 123 is a DSRC-equipped vehicle) The network 105 may include a DSRC communication channel shared among the ego vehicle 123 and a second vehicle such as the remote vehicle 124.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a standard-compliant GPS unit 150; a communication unit 145; an onboard unit 139; a memory 127; and a path change system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the path change system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data 191 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data 191 that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the senor set 126.

The physical environment may include a roadway region, parking lot, or parking garage that is proximate to the ego vehicle 123. The sensor data 191 may describe measurable aspects of the physical environment. In some embodiments, the physical environment is the roadway environment 170. As such, in some embodiments, the roadway environment 170 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123. An item is "proximate to the ego vehicle 123" if it is directly measurable by a sensor of the ego vehicle 123 or its presence is inferable and/or determinable by the path change system 199 based on analysis of the sensor data 191 which is recorded by the ego vehicle 123 and/or one or more of the vehicular micro cloud 194.

In some embodiments, the sensors of the sensor set 126 are operable to collect sensor data 191. The sensors of the sensor set 126 include any sensors that are necessary to measure and record the measurements described by the sensor data 191. In some embodiments, the sensor data 191 includes any measurements that are necessary to generate the other digital data stored by the memory 127.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication. Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication-Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication-Application layer (review); and EN 13372:2004 Dedicated Short-Range Communication (DSRC)—DSRC profiles for RTTT applications (review); EN ISO 14906:2004 Electronic Fee Collection-Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this vehicle 123 as provided by the standard-compliant GPS unit 150.

In some embodiments, the GPS data describes a location of a queue with lane-level accuracy.

An example process for generating GPS data describing a geographic location of an object (e.g., a queue, the ego vehicle 123, the remote vehicle 124, or some other object located in a roadway environment) is now described according to some embodiments. In some embodiments, the path change system 199 include code and routines that are operable, when executed by the processor 125, to cause the processor to: analyze (1) GPS data describing the geographic location of the ego vehicle 123 and (2) sensor data 191 describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the path change system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical parking space is approximately 3 meters wide. However, a conventional GPS unit only has an accuracy of plus or minus 10 meters relative to the actual location of the ego vehicle 123. As a result, such conventional GPS units are not sufficiently accurate to enable the path change system 199 to determine the lane of travel of the ego vehicle 123. This measurement improves the accuracy of the GPS data describing the location of parking spaces used by the path change system 199 when providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the parking space is digital data that describes a geographic location of an object. One or more of these two types of GPS data may have lane-level accuracy. In some embodiments, one or more of these two types of GPS data are described by the sensor data 191.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the path change system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection-Application interface EN 11253:2004 Dedicated Short-Range Communication-Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication-Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message. In some embodiments, the V2X radio 144 is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the example general method or below with reference to the method 300 depicted in FIG. 3 are transmitted by the C-V2X radio on the upper 30 MHz of the 5.9 GHz band (i.e., 5.895-5.925 GHz) as directed by the path change system 199.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSM messages which are regularly broadcast by the V2X radio 144 (e.g., at an interval of once every 0.10 seconds).

In some embodiments, the V2X radio 144 includes any hardware or software which is necessary to make the ego vehicle 123 compliant with the DSRC standards. In some embodiments, the standard-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 191; the driving path data 192; the subset data 193; the digital twin data 184; the pedestrian data 196; the modified path data 197; the walking path data 195; the risk data 198; the member data 189; the sensor data 191; and the technical data 147. These elements of the memory were described above with reference to the first example general method and the second example general method, and so, those descriptions will not be repeated here.

In some embodiments, the path change system 199 includes code and routines that are operable, when executed by the processor 125, to execute one or more steps of one or more of the method 300 described below with reference to FIG. 3. In some embodiments, the path change system 199 includes code and routines that are operable, when executed by the processor 125, to execute one or more steps of the first example general method described above. In some embodiments, the path change system 199 includes code and routines that are operable, when executed by the processor 125, to execute one or more steps of the second example general method described above.

In some embodiments, the path change system 199 is an element of the onboard unit 139 or some other onboard vehicle computer.

In some embodiments, the path change system 199 is implemented using hardware including a field-programmable gate array ("FPGA") or an application-specific integrated circuit ("ASIC"). In some other embodiments, the path change system 199 is implemented using a combination of hardware and software.

The remote vehicle 124 includes elements and functionality which are similar to those described above for the ego vehicle 123, and so, those descriptions will not be repeated here. In some embodiments, the ego vehicle 123 and the remote vehicle 124 are located in a roadway environment 170. The roadway environment is a portion of the real-world that includes a roadway, the ego vehicle 123, the remote vehicle 124, and a pedestrian. The roadway environment 170 may include other elements such as the vehicular micro cloud 194, roadway signs, environmental conditions, traffic, etc. The roadway environment 170 includes some or all of the tangible and/or measurable qualities described above with reference to the sensor data 191.

The edge server 102 is a connected processor-based computing device that is not a member of the vehicular micro cloud 194 and includes an instance of the path change system 199 and a memory 127. In some embodiments, the memory 127 stores the information data 182.

In some embodiments, the edge server 102 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the path change system 199 and a non-transitory memory that stores at least one instance of the information data 182. The edge server 102 may include a backbone network.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123 and the remote vehicle 124), and optionally devices such as a roadside unit, form a cluster of interconnected vehicles that are located at a same geographic region. These connected vehicles (and, optionally, connected devices) are interconnected via Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the edge server 102. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the path change system 199 includes encryption keys for encrypting wireless messages and decrypting the wireless messages described herein.

The pedestrian 103 is a human user wearing a pedestrian device 171. In some embodiments, the pedestrian 103 is near a roadway. For example, and only by way of illustration, the pedestrian 103 is trying to cross a roadway. The pedestrian 103 is wearing a pedestrian device 171. The pedestrian device 171 includes a processor-based computing device that includes a processor, a memory, a client stored in the memory and accessible to be executed by the processor, and pedestrian data 196 stored in the memory. The client causes the camera of the pedestrian device 171 to capture images 173 of the roadway environment 170. The images are described by the pedestrian data 196. The client, when executed by the processor of the pedestrian device, causes the communication unit of the pedestrian device 171 to transmit the pedestrian data 196 to a group of vehicles (e.g., the ego vehicle 123 and the remote vehicle 124) via the network 105. For example, the client causes the communication unit to transmit a V2X message including the pedestrian data 196 as its payload to the group of vehicles.

In some embodiments, the pedestrian data 196 is included in the digital twin data 184 which is used to generate digital twin simulations of the roadway environment 170 that includes the pedestrian 103 and the pedestrian data 196 is used to simulate the pedestrian in the digital twin simulations.

In some embodiments, the pedestrian device 171 is worn on a head of the pedestrian 103. In some embodiments, the pedestrian device 171 is worn by the pedestrian 103 on a location that is not their arm or hand.

In some embodiments, the pedestrian device 171 is a pair of smart glasses or AR goggles. The pedestrian device 171 is not a smartphone 172.

Figure 2:
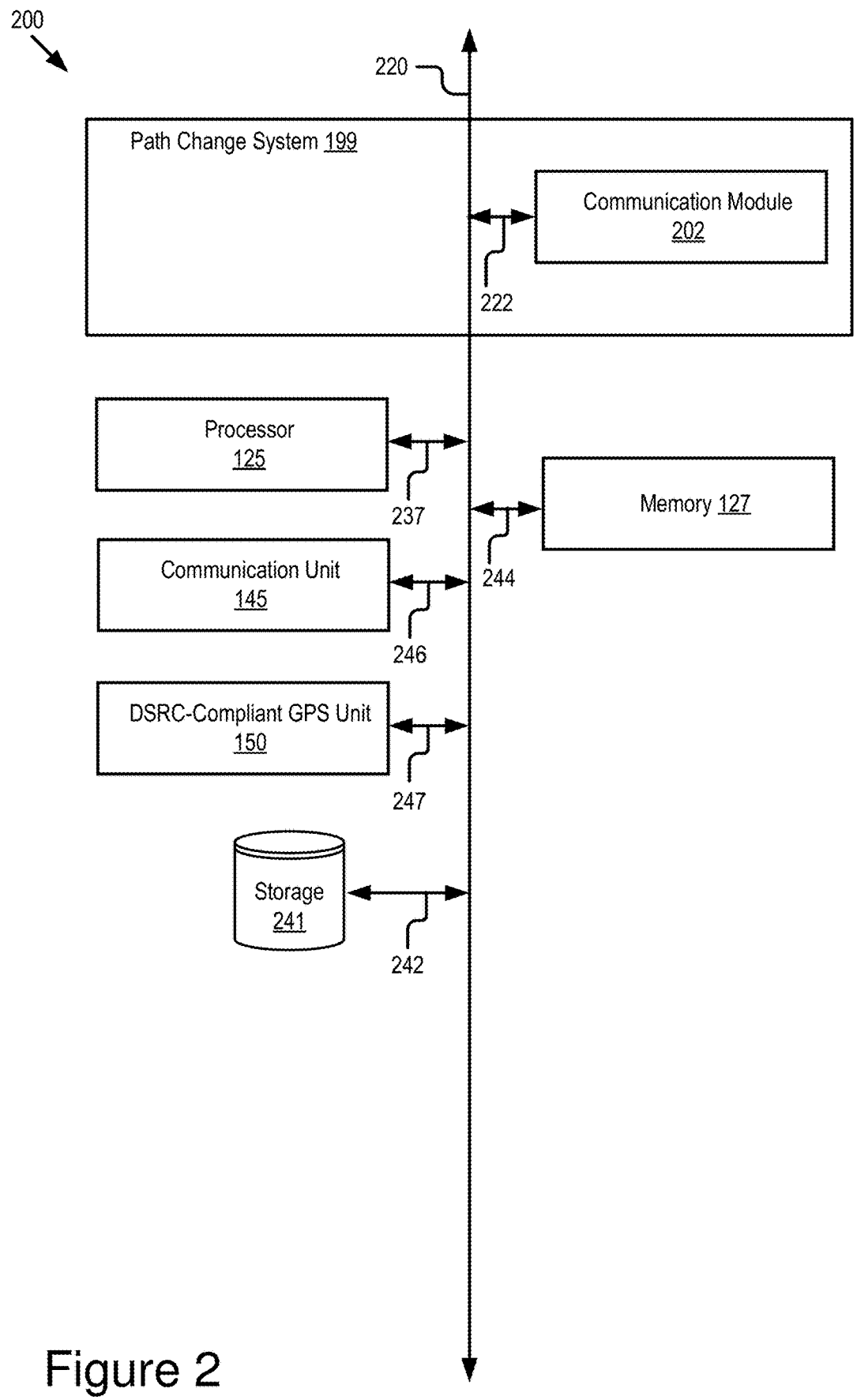
FIG. 2 is a block diagram illustrating an example computer system including a path change system according to some embodiments.

Referring now to FIG. 2, depicted is a block diagram illustrating an example computer system 200 including a path change system 199 according to some embodiments.

In some embodiments, the computer system 200 may include a special-purpose computer system that is programmed to perform one or more steps of one or more of the method 300 described herein with reference to FIG. 3. In some embodiments, the computer system 200 may include a special-purpose computer system that is programmed to perform one or more steps of one or more of the first example general method described above and the second general example described above.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the path change system 199; a processor 125; a communication unit 145; a standard-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The standard-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the standard-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the path change system 199 includes code and routines that are operable, when executed by the processor 125, to cause the processor 125 to execute one or more steps of the method 300 described herein with reference to FIG. 3. In some embodiments, the path change system 199 includes code and routines that are operable, when executed by the processor 125, to cause the processor 125 to execute one or more steps of the first example general method described above. In some embodiments, the path change system 199 includes code and routines that are operable, when executed by the processor 125, to cause the processor 125 to execute one or more steps of the second example general method described above.

In the illustrated embodiment shown in FIG. 2, the path change system 199 includes a communication module 202.

The communication module 202 can be software including routines for handling communications between the path change system 199 and other components of the computer system 200. In some embodiments, the communication module 202 can be a set of instructions executable by the processor 125 to provide the functionality described below for handling communications between the path change system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the path change system 199 and stores the data in one or more of the storage 241 and the memory 127.

In some embodiments, the communication module 202 may handle communications between components of the path change system 199 or the computer system 200.

Referring now to FIG. 3, depicted is a flowchart of an example method 300. The method 300 includes step 305, step 310, step 315, step 320, and step 325 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for collaborative computing by a set of onboard vehicles computers installed in a plurality of connected vehicles, the method comprising:
   analyzing, by the set of onboard vehicle computers, sensor data and pedestrian data to determine (1) a scenario depicted by the pedestrian data and (2) a subset of the connected vehicles from among the plurality of connected vehicles that have a line of sight to a pedestrian, wherein the pedestrian data is generated by a pedestrian device which captures images as viewed by the pedestrian and the sensor data is generated by the plurality of connected vehicles;

identifying a group of conflicted vehicles from the subset of the connected vehicles whose driving paths conflict with a walking path of the pedestrian;

determining, based on the scenario, digital twin data describing a digital twin simulation that corresponds to the scenario;

determining for each of the connected vehicles in the group of conflicted vehicles, based on the digital twin data and the pedestrian data, a modified driving path for each of the connected vehicles in the group of connected vehicles; and causing the group of conflicted vehicles to travel in accordance with the modified driving path for each of the connected vehicles in the group of connected vehicles.

2. The method of claim 1, wherein the digital twin simulation is configured to identify optimized driving paths for each of the conflicted vehicles in the group of conflicted vehicles that improves safety.

3. The method of claim 1, wherein the modified driving path are operable to optimize safety based on one or more safety thresholds.

4. The method of claim 1, wherein different tasks of the method are executed by different onboard vehicle computers of the plurality of connected vehicles.

5. The method of claim 4, wherein the different tasks are assigned by an ego vehicle.

6. The method of claim 5, wherein the ego vehicle is a connected vehicle from the plurality of connected vehicles having a greatest computational ability relative to other connected vehicles included in the plurality of connected vehicles.

7. The method of claim 1, wherein the plurality of connected vehicles is a vehicular micro cloud and the plurality of connected vehicles collaborate with one another via wireless communication to perform one or more computational tasks.

8. The method of claim 1, wherein the plurality of connected vehicles is not a vehicular micro cloud.

9. A computer program product included in a set of onboard vehicle computers included in a plurality of connected vehicles, the computer program product comprising computer code that is operable, when executed by the set of onboard vehicle computers, to cause the set of onboard vehicle computers to provide collaborative computing by executing steps including:

analyzing, by the set of onboard vehicle computers, pedestrian data to determine a scenario depicted by the pedestrian data and a subset of the connected vehicles from the plurality of connected vehicles that are in a line of sight of a pedestrian, wherein the pedestrian data is generated by a pedestrian device which captures images as viewed by the pedestrian;

identifying a group of conflicted vehicles from the subset of the connected vehicles whose driving paths conflict with a walking path of the pedestrian;

determining, based on the scenario, digital twin data describing a digital twin simulation that corresponds to the scenario;

determining for each vehicle in the group of conflicted vehicles, based on the digital twin data and the pedestrian data, a modified driving path for each of the connected vehicles in the group of connected vehicles; and causing the group of conflicted vehicles to travel in accordance with the modified driving path for each of the connected vehicles in the group of connected vehicles.

10. The computer program product of claim 9, wherein the digital twin simulation is configured to identify optimized driving paths for each of the conflicted vehicles in the group of conflicted vehicles that improves safety.

11. The computer program product of claim 9, wherein the modified driving path is operable to optimize safety.

12. The computer program product of claim 9, wherein different tasks of the steps are executed by different onboard vehicle computers of the plurality of connected vehicles.

13. The computer program product of claim 12, wherein the different tasks are assigned by an ego vehicle that is a hub vehicle.

14. A system comprising:

a plurality of connected vehicles each including a communication unit that is communicatively coupled to an onboard vehicle computer so that the plurality of connected vehicles includes a set of onboard vehicle computers, wherein the set of onboard vehicle computers are executing computer-executable code that is operable, when executed by the set of onboard vehicle computers, to cause the set of onboard vehicle computers to provide collaborative computing by executing operations including:

analyzing, by the set of onboard vehicle computers, pedestrian data to determine a scenario depicted by the pedestrian data and a subset of the connected vehicles from the plurality that are in a line of sight of a pedestrian, wherein the pedestrian data is generated by a pedestrian device which captures images as viewed by the pedestrian;

identifying a group of conflicted vehicles from the subset of the connected vehicles whose driving paths conflict with a walking path of the pedestrian;

determining, based on the scenario, digital twin data describing a digital twin simulation that corresponds to the scenario;

determining for each of the group of connected vehicles, based on the digital twin data and the pedestrian data, a modified driving path; and causing the group of conflicted vehicles to travel in accordance with the modified driving path for each of the connected vehicles in the group of connected vehicles.

15. The system of claim 14, wherein the digital twin simulation is configured to identify optimized driving paths for each of the conflicted vehicles in the group of conflicted vehicles that improves safety.

16. The system of claim 14, wherein the modified driving path is operable to optimize safety.

17. The system of claim 14, wherein different portions of the operations are executed by different onboard vehicle computers of the plurality of connected vehicles.

18. The system of claim 17, wherein the different portions of the operations are assigned by an ego vehicle.

19. The system of claim 18, wherein the ego vehicle is a connected vehicle from the plurality of connected vehicles having a greatest computational ability relative to other connected vehicles in the plurality of connected vehicles.

20. The system of claim 14, wherein the plurality of connected vehicles is a vehicular micro cloud.

\* \* \* \* \*